United States Patent Office 2,976,999
Patented Mar. 28, 1961

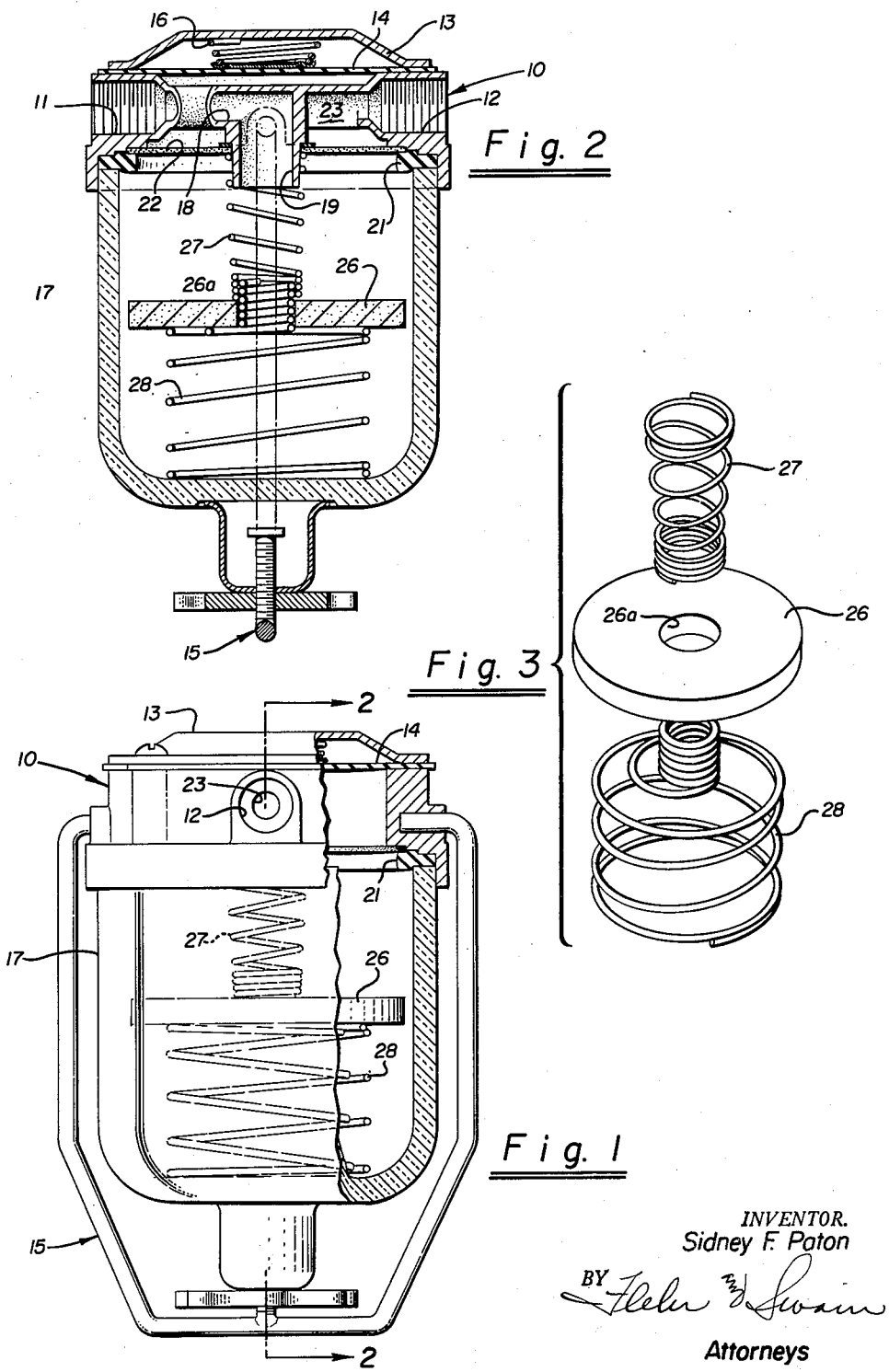

2,976,999

MAGNETIC FILTER FOR FUEL SYSTEMS AND MOUNTING THEREFOR

Sidney F. Paton, 65 Rockaway Ave., San Francisco, Calif.

Filed Dec. 5, 1958, Ser. No. 778,413

2 Claims. (Cl. 210—223)

This invention relates to a magnetic fuel separator or filter and particularly to a device of this kind which is adapted to be positioned in the fuel line of an internal combustion engine, particularly of the type used in connection with automotive vehicles.

The service requirements for automotive gasoline strainers and filters have become very critical due to recent carburetor and fuel developments. New high efficiency and high performance fuels require carburetors having extremely fine jets which require the fuel to be more perfectly filtered to prevent clogging or erosion of the jets.

A large proportion of the deposits on present day fuel strainers consists of iron and steel particles which block the filtering surface and reduce the efficiency and capacity. In the event these elements are successfully passed through the filter it is apparent that they will lodge on the internal working parts of the engines where they cause considerable damage and wear and form deposits which decrease the efficiency of the valve mechanism, etc.

In order to prevent these particles from becoming imbedded in the filter surface or from passing through the filter surface and lodging themselves in the engine with the previously suggested deleterious results, we propose to position a magnet within the filter unit to collect these particles before they are deposited on the filter surface.

It is a principal object of this invention to provide an annular magnetic ring or collector in the path of the normal flow of the fuel before the fuel normally passes through the conventional filter element so as to remove from the fuel as much of the contaminated material as possible.

It is a further object of this invention to provide an annular magnetic ring collector in the path of the normal flow of the fuel and to provide a simple element of this type which may be positioned in the bowl of conventional filter elements as a replacement element.

It is a further object of this invention to provide a device of this type which may be positioned in the conventional automobile fuel filter system without requiring replacement of any of the elements and without disturbing the present elements or interfering with or altering their normal mode of operation.

Other objects and advantages of this invention will appear from the following specifications taken in conjunction with the accompanying drawings in which:

Figure 1 represents a side elevational view, partially in cross section, of an improved filter element and another conventional element incorporating my magnetic filter therein.

Figure 2 represents a cross-sectional detailed view of the device illustrated in Figure 1 showing the path of the fuel through the device and the positioning of the magnetic filter in the conventional bowl.

Figure 3 shows the magnetic filter and its two supporting elements in separated and exploded position.

The filter device is generally the type which is illustrated in Andrews Patent 2,544,289, granted March 6, 1951, which discloses a filter and pulsation dampener which is adapted to absorb the pulsations of the fuel in the fuel line and to deliver fuel at a steady rate to the carburetor. This device also provides an excellent housing for the conventional filter or strainer which is adapted to strain or filter substantially all of the contaminants from the fuel which is passed therethrough.

One manner of positioning a magnetic filter in a device of this general type is illustrated in my copending application, Serial No. 670,012, filed July 5, 1957, now abandoned, for "Magnetic Filter For Fuel Systems" of which this application is a continuation-in-part.

The device illustrated in Figures 1 and 2 consists of a body 10 which is provided with a threaded inlet 11 and a threaded outlet 12 and which is adapted to be connected by suitable tubular conduits to the remainder of the fuel system. The body 10 may be cast of any suitable material and is provided at its top with an enlarged opening which is adapted to support a cover 13, a diaphragm 14, and a spring 16 whose purpose is more fully disclosed and claimed in said Patent 2,544,289. The area below the diaphragm 14 is in communication with the larger area which is defined by the bowl 17 which is secured to the lower side of the body 10 by means of a bail 15.

As indicated particularly in Figure 2, the body 10 is provided with an elongated fuel passageway 18 through which the fuel is introduced into the device. The passageway 18 terminates at about the center of the housing 10, in a horizontal plane, and is provided with a downwardly extending tubular extension 19 through which the fuel is discharged.

The bowl 17 is separated from the housing 10 by a gasket 21 and the two portions 10 and 17 are so constructed as to provide a seat to support a filter element 22. The filter element 22 abuts the exterior wall of the downwardly extending tubular member 19 in such a manner that a filter proof seal is provided therebetween. Thus any fuel which flows into the bowl 17 through the member 19 will be passed through the filter 22 before it can pass through the outlet passage 23 and into the carburetor of the vehicle.

The filter and pulsation dampener thus far described is more or less conventional. It is to be understood that the body portion 10 may be formed of any suitable material which can be cast and which can be provided with the necessary threads and passageways. The bowl element 17 may be formed of metal, glass or suitable plastics so that it may be either opaque, translucent or transparent.

In the embodiment illustrated in Figure 2, I have provided a magnetic separator element 26 which may be of the so-called ceramic type. It may be formed of any other suitable magnetic material, and it is only necessary, for the proper operation of my device, that the magnetic element 26 create a magnetic field which is adapted to attract any ferrous particles in the fuel.

The magnetic element 26 is supported in the bowl by a pair of spring elements 27 and 28. In the form illustrated in the drawings, the ceramic disc 26 is provided with a centrally disposed orifice. The lower spring member 28 is adapted to engage the lower wall of the bowl 17 and provide a shoulder 28a upon which the ceramic magnetic member 26 rests. The spring element 28 is provided with a plurality of convolutions of decreased diameter, and the outer diameter of this portion of the spring is only slightly smaller than the diameter of the centrally disposed orifice 26a in the magnetic element 26 whereby the magnetic wafer-like element 26 will be more or less centrally positioned with respect to the spring 28 and will be supported by the spring 28.

The upper spring member 27 is adapted to engage the filter element 23 at the point at which it surrounds the tubular extension 18 and to engage the upper surface of the magnetic element 26. The convolutions of the spring 27 may be of any desired diameter but as illustrated in Figure 2 I prefer that the inner diameter of the spring 27 be substantially equal to the outer diameter of the extension 28a on the spring 28 so that, in effect, the two tend to telescope with the result that they form a friction fit thus tending to engage or support the wafer-like magnetic element 26.

By providing a pair of springs in this manner and of this type, I support the magnetic separator element 26 at a predetermined desired point within the bowl 17. Moreover a spring mounting of this type permits the same device to be utilized in connection with bowls 17 of various sizes.

The relationship of the fuel inlet and the surface of the magnet are important. As illustrated in Figure 2, the position of the fuel inlet serves to divert the flow of fuel directly at the surface of the magnet where the path of the flow is turned back toward the filtering element. The magnet is centrally disposed with respect to the bowl and the field of magnetic influence encompasses the entire area of the flow within the bowl so that all fuel which enters the bowl is diverted directly at the surface of the magnet and passes either in intimate contact with the magnet or through the magnetic field surrounding the magnet.

It is apparent that the specific spring mounting illustrated in the drawings and described herein, while representing the preferred embodiment of my invention, does not represent the only manner of mounting the magnetic element 26. It, the element 26, may be supported upon bosses which are molded in the bowl 17 or upon any other suitable means which positions the magnetic element 26 in the place and in the manner claimed.

I claim:

1. A filtering device comprising: a top body member having fuel inlet and fuel outlet flow passages; a bowl supported by and below said body; a filter element mounted on said body adjacent and in advance of said fuel outlet to prevent the access of unfiltered fuel thereto, the fuel inlet passage being centrally disposed with respect to said body and adapted to direct the flow of fuel downwardly into said bowl, a magnetic element positioned in a central zone in said bowl and having a substantially flat horizontal surface, said fuel inlet passage adapted to direct fuel into said zone and to direct the fuel flow from said passageway downwardly in said bowl and across the flat surfaces of said magnet in relatively close proximity thereto, said magnet being so positioned that it creates a field of magnetic influence and means for supporting said magnet at a predetermined position in said bowl comprising a pair of springs, one of said spring supporting said magnet from the bottom and resting on said bowl and the other of said springs engaging the top of said magnet and engaging said body adjacent said filter.

2. A filtering device comprising: a top body member having fuel inlet and fuel outlet flow passages; a bowl supported by and below said body; a filter element mounted on said body adjacent and in advance of said fuel outlet to prevent the access of unfiltered fuel thereto, the fuel inlet passage being centrally disposed with respect to said body and adapted to direct the flow of fuel downwardly into said bowl, a magnetic element positioned in a central zone in said bowl and having a substantially flat horizontal surface and a centrally disposed aperture therein, said fuel inlet passage adapted to introduce fuel into said zone and to direct the fuel flow from said passageway downwardly in said bowl and across the flat surfaces of said magnet in relatively close proximity thereto, said magnet being so positioned that it creates a field of magnetic influence and means for supporting said magnet at a predetermined position in said bowl comprising a pair of springs, one of said springs supporting said magnet from the bottom and resting on said bowl and extending upwardly through said aperture and the other of said springs engaging the top of said magnet and that portion of the said first spring which extends through said aperture and engaging said body adjacent said filter.

References Cited in the file of this patent

UNITED STATES PATENTS

| | | |
|---|---|---|
| 2,437,221 | Cox et al. | Mar. 2, 1948 |
| 2,544,289 | Andrews | Mar. 6, 1951 |
| 2,680,519 | Rundquist et al. | June 8, 1954 |
| 2,760,637 | Franch | Aug. 28, 1956 |